United States Patent
Pietquin et al.

(10) Patent No.: US 11,868,882 B2
(45) Date of Patent: Jan. 9, 2024

(54) TRAINING ACTION SELECTION NEURAL NETWORKS USING APPRENTICESHIP

(71) Applicant: DEEPMIND TECHNOLOGIES LIMITED, London (GB)

(72) Inventors: Olivier Claude Pietquin, Lille (FR); Martin Riedmiller, Balgheim (DE); Wang Fumin, London (GB); Bilal Piot, London (GB); Mel Vecerik, London (GB); Todd Andrew Hester, Seattle, WA (US); Thomas Rothoerl, London (GB); Thomas Lampe, London (GB); Nicolas Manfred Otto Heess, London (GB); Jonathan Karl Scholz, London (GB)

(73) Assignee: DeepMind Technologies Limited, London (GB)

( * ) Notice: Subject to any disclaimer, the term of this patent is extended or adjusted under 35 U.S.C. 154(b) by 333 days.

(21) Appl. No.: 16/624,245

(22) PCT Filed: Jun. 28, 2018

(86) PCT No.: PCT/EP2018/067414
§ 371 (c)(1),
(2) Date: Dec. 18, 2019

(87) PCT Pub. No.: WO2019/002465
PCT Pub. Date: Jan. 3, 2019

(65) Prior Publication Data
US 2020/0151562 A1   May 14, 2020

Related U.S. Application Data

(60) Provisional application No. 62/526,290, filed on Jun. 28, 2017.

(51) Int. Cl.
*G06N 3/02* (2006.01)
*G06N 3/08* (2023.01)
(Continued)

(52) U.S. Cl.
CPC ............... *G06N 3/08* (2013.01); *G06N 3/045* (2023.01); *G06N 3/047* (2023.01)

(58) Field of Classification Search
CPC .... G06N 3/006; G06N 3/0454; G06N 3/0472; G06N 3/08; G06N 3/04; G06N 3/00;
(Continued)

(56) References Cited

U.S. PATENT DOCUMENTS 9,679,258 B2 * 6/2017 Mnih ..................... G06N 3/006
10,885,432 B1 * 1/2021 Dulac-Arnold ........ G06N 3/084
(Continued)

FOREIGN PATENT DOCUMENTS

CN   CN106056213   10/2016

OTHER PUBLICATIONS

Office Action in European Appln. No. 18735278.6, dated Jul. 8, 2021, 11 pages.
(Continued)

*Primary Examiner* — Huyen X Vo
(74) *Attorney, Agent, or Firm* — Fish & Richardson P.C.

(57) ABSTRACT

An off-policy reinforcement learning actor-critic neural network system configured to select actions from a continuous action space to be performed by an agent interacting with an environment to perform a task. An observation defines environment state data and reward data. The system has an actor neural network which learns a policy function mapping the state data to action data. A critic neural network learns an action-value (Q) function. A replay buffer stores tuples of the state data, the action data, the reward data and new state data. The replay buffer also includes demonstration transi-
(Continued)

tion data comprising a set of the tuples from a demonstration of the task within the environment. The neural network system is configured to train the actor neural network and the critic neural network off-policy using stored tuples from the replay buffer comprising tuples both from operation of the system and from the demonstration transition data.

20 Claims, 4 Drawing Sheets

(51) Int. Cl.
    G06N 3/045    (2023.01)
    G06N 3/047    (2023.01)
(58) Field of Classification Search
    CPC ....... G10L 15/22; G10L 5/1815; G10L 15/18; G10L 2015/088; G10L 15/08; G10L 2015/223; G10L 2203/2094; G10L 15/00; G06F 40/30; G06F 3/167; G06F 3/16; H04L 41/16; H04Q 3/64; H04M 3/38; H04M 2201/40; H04M 2203/2094; H04M 2203/6045; H04M 2250/12; H04M 2250/10; H04M 2250/52; H04M 1/0264; H04M 3/167; H04M 3/42374; H04M 3/42
    USPC .......................................................... 706/15
    See application file for complete search history.

(56) References Cited

U.S. PATENT DOCUMENTS

| | | | | |
|---|---|---|---|---|
| 11,049,008 | B2* | 6/2021 | Mnih | G06N 3/006 |
| 11,288,568 | B2* | 3/2022 | Gu | G06N 3/0427 |
| 2003/0074338 | A1 | 4/2003 | Young et al. | |
| 2014/0344202 | A1* | 11/2014 | Thibeault | G06N 3/049 |
| | | | | 706/25 |
| 2017/0024643 | A1* | 1/2017 | Lillicrap | G06N 3/084 |
| 2017/0228662 | A1* | 8/2017 | Gu | G06N 3/0427 |
| 2017/0278018 | A1* | 9/2017 | Mnih | G06N 3/08 |
| 2018/0165603 | A1* | 6/2018 | Van Seijen | G06N 3/0454 |
| 2020/0151562 | A1* | 5/2020 | Pietquin | G06N 3/0472 |
| 2021/0271968 | A1* | 9/2021 | Ganin | G06N 3/0445 |

OTHER PUBLICATIONS

Yahya et al., "Collective robot reinforcement learning with distributed asynchronous guided policy search," 2017 IEEE/RSJ International Conference on Intelligent Robots and Systems, Sep. 2017, 8 pages.
Bruin et al., "Off-policy experience retention for deep actor-critic learning," 30th Conference on Neural Information Processing Systems (NIPS 2016), Dec. 2016, 9 pages.
Finn et al., "Guided cost learning: Deep inverse optimal control via policy optimization," Proceedings of the 33rd International Conference on International Conference on Machine Learning, Jun. 2016, 10 pages.
Gu et al., "Continuous deep q-learning with model-based acceleration" Proceedings of the 33rd International Conference on Machine Learning, Jun. 2016, 10 pages.
Hester et al., "Learning from Demonstrations for Real World Reinforcement Learning," https://arxiv.org/abs/1704.03732v1, Apr. 2017, 11 pages.
Ho et al., "Generative Adversarial Imitation Learning," 30th Conference on Neural Information Processing Systems (NIPS 2016), Dec. 2016, 9 pages.
Klein et al., "A cascaded supervised learning approach to inverse reinforcement learning," In Proc. of ECML, Sep. 2013, 16 pages.
Levine et al., "Guided Policy Search," Proceedings of the 30th International Conference on Machine Learning, Feb. 2013, 9 pages.
Lillicrap et al., "Continuous control with deep reinforcement learning," https://arxiv.org/abs/1509.02971v5, Feb. 2016, 14 pages.
Mnih et al., "Human-level control through deep reinforcement learning," Nature, Feb. 2015, 518:13 pages.
Ng et al., "Policy invariance under reward transformations: Theory and application to reward shaping," Jun. 1999, retrieved on Feb. 5, 2020, retrieved from URL <http://luthuli.cs.uiuc.edu/~daf/courses/games/AIpapers/ng99policy.pdf>, 10 pages.
PCT International Preliminary Report on Patentability in International Appln. No. PCT/EP2018/067414, dated Dec. 31, 2019, 16 pages.
PCT International Search Report and Written Opinion in International Appln. No. PCT/EP2018/067414, dated Oct. 11, 2018, 22 pages.
Pomerleau, "ALVINN: An autonomous land vehicle in a neural network," 1989, retrieved on Feb. 5, 2020, retrieved from URL <http://citeseerx.ist.psu.edu/viewdoc/download?doi=10.1.1.830.2188&rep=rep1&type=pdf>, 305-313.
Popov et al., "Data-efficient Deep Reinforcement Learning for Dexterous Manipulation," https://arxiv.org/abs/1704.03073, Apr. 2017, 12 pages.
Ratliff et al., "Imitation Learning for Locomotion and Manipulation," 2007 7th IEEE-RAS International Conference on Humanoid Robots, Nov. 2007, 392-397.
Ross et al., "A Reduction of Imitation Learning and Structured Prediction to No-Regret Online Learning," Proceedings of the 14th International Conference on Artificial Intelligence and Statistics (AISTATS), Jun. 2011, 627-635.
Schaul et al., "Prioritized Experience Replay," https://arxiv.org/abs/1511.05952v4, last revised Feb. 2016, 21 pages.
Schulman et al., "Trust Region Policy Optimization," Proceedings of the 31st International Conference on Machine Learning, Jun. 2015, 9 pages.
Sharma et al., "Learning to Mix n-Step Returns: Generalizing lambda-Returns for Deep Reinforcement Learning," https://arxiv.org/abs/1705.07445v1, May 2017, 21 pages.
Syed et al., "A Game-Theoretic Approach to Apprenticeship Learning," Proceedings of the 20th International Conference on Neural Information Processing Systems, Dec. 2007, 8 pages.
Syed et al., "Apprenticeship Learning Using Linear Programming," Proceedings of the 25th international conference on Machine learning, Jul. 2008, 1032-1039.
Todorov et al., "A generalized iterative LQG method for locally-optimal feedback control of constrained nonlinear stochastic systems," American Control Conference, Jun. 2005, 300-306.
Todorov et al., "MuJoCo: A physics engine for model-based control," 2012 IEEE/RSJ International Conference on Intelligent Robots and Systems, Oct. 2012, 5026-5033.
Vecerik et al., "Leveraging Demonstrations for Deep Reinforcement Learning on Robotics Problems with Sparse Rewards," https://arxiv.org/abs/1707.08817v1, Jul. 2017, 10 pages.
Ziebart et al., "Maximum Entropy Inverse Reinforcement Learning," Proceedings of the Twenty-Third AAAI Conference on Artificial Intelligence, Jul. 2008, 1433-1438.
Office Action in Chinese Appln. No. 201880028844.3, dated Sep. 23, 2022, 14 pages (with English translation).

* cited by examiner

TRAINING ACTION SELECTION NEURAL NETWORKS USING APPRENTICESHIP

CROSS-REFERENCE TO RELATED APPLICATION

This application is a National Stage Application under 35 U.S.C. § 371 and claims the benefit of International Application No. PCT/EP2018/067414, filed on Jun. 28, 2018, which claims priority to U.S. Provisional Application Serial No. 62/526,290, filed on Jun. 28, 2017. The disclosure of the prior application is considered part of and is incorporated by reference in the disclosure of this application.

BACKGROUND

This specification relates to reinforcement learning.

In a reinforcement learning system, an agent interacts with an environment by performing actions that are selected by the reinforcement learning system in response to receiving observations that characterize the current state of the environment.

Some reinforcement learning systems select the action to be performed by the agent in response to receiving a given observation in accordance with an output of a neural network.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification generally describes a reinforcement learning (RL) system that selects actions to be performed by a reinforcement learning agent interacting with an environment. In order for the agent to interact with the environment, the system receives data characterizing the current state of the environment and selects an action to be performed by the agent in response to the received data. Data characterizing a state of the environment will be referred to in this specification as an observation.

In some implementations, the environment is a simulated environment and the agent is implemented as one or more computer programs interacting with the simulated environment. For example, the simulated environment may be a video game and the agent may be a simulated user playing the video game. As another example, the simulated environment may be a motion simulation environment, e.g., a driving simulation or a flight simulation, and the agent is a simulated vehicle navigating through the motion simulation. In these implementations, the actions may be control inputs to control the simulated user or simulated vehicle.

In some other implementations, the environment is a real-world environment and the agent is a mechanical agent interacting with the real-world environment. For example, the agent may be a robot interacting with the environment to accomplish a specific task. As another example, the agent may be an autonomous or semi-autonomous vehicle navigating through the environment. In these implementations, the actions may be control inputs to control the robot or the autonomous vehicle.

In one aspect a method of training a reinforcement learning system to select actions to be performed by an agent interacting with an environment to carry out a task involves capturing training data from a demonstration of the task within the environment. A corresponding system is also provided.

In more detail there is described an off-policy reinforcement learning actor-critic neural network system, to select actions to be performed by an agent interacting with an environment to perform a task. The system comprises a first input to receive an observation comprising state data characterizing a state of the environment, and reward data representing a reward from operating with an action in the environment. The system may further comprise at least one actor neural network, coupled to receive the state data and configured to define a policy function mapping the state data to action data defining an action. The at least one actor neural network may have an output to provide the action data for the agent to perform the action. The environment may transition to a new state in response to the action. The system may further comprise at least one critic neural network, coupled to receive the action data, the state data, and return data derived from the reward data. The critic neural network may be configured to define a value function for an error signal, more particularly a value function which is used to generate an error signal. The system may further comprise a replay buffer to store reinforcement learning transitions comprising operation transition data from operation of the system. The operation transition data may comprise tuples of the state data, the action data, the reward data and new state data representing the new state. The system may further comprise a second input to receive training data defining demonstration transition data, the demonstration transition data comprising a set of the tuples from a demonstration of the task within the environment. Reinforcement learning transitions stored in the replay buffer may further comprise the demonstration transition data. The neural network system may be configured to train the at least one actor neural network and the at least one critic neural network off-policy using the error signal and using stored tuples from the replay buffer comprising tuples from both the operation transition data and the demonstration transition data.

The reward may be a sparse reward which has a plurality of discrete values dependent upon the state of the environment. Only a minority subset of states of the environment may provide the reward.

The reinforcement learning system may include a sample selection system or sampling module to sample the reinforcement learning transitions according to a sampling probability. In implementations the sampling probability prioritizes sampling of the demonstration transition data tuples.

The return data may comprise a combination of the reward data and values from the critic neural network obtained from an (n-1)-step forward rollout of actions selected using the actor neural network. The system may be configured to employ at least two different values of n to train the network. More particularly the system may be configured to train the critic neural network using return data which comprises a mix of 1-step and n-step returns.

The system may comprise learning and target actor neural networks and learning and target critic neural networks. The neural network system may be configured to update the learning critic neural network off-policy using the error signal. The error signal may be derived from the target critic target neural network, the target actor neural network, and the stored tuples of both the operation transition data and the demonstration transition data. The system may be configured to update the learning actor neural network using a deterministic policy gradient comprising a product of a gradient of the output of the learning critic neural network and a gradient of the output of the learning actor neural network evaluated using the stored tuples of both the operation transition data and the demonstration transition data. The system may be configured to, at intervals, update weights of the target actor neural network using the learning actor neural network and to update weights of the target critic neural network using the learning critic neural network. The at intervals updating may involve the weights of the target actor and critic neural networks slowly tracking those of the learning actor and critic neural networks.

In some implementations the training data may comprises kinesthetic teaching data from manipulation of a mechanical system. The kinesthetic teaching data may be derived from a human physically interacting with the environment using the agent, or using a version or copy or simulation of the agent and/or environment. In some implementations the system includes a safety controller to impose safety or other constraints on the action data.

There is also described a method of training a reinforcement learning system to select actions to be performed by an agent interacting with an environment to perform a task. The method may comprise capturing training data from a demonstration of the task within the environment. The training data may define demonstration transition data for a series of demonstration transitions. Each transition may comprise state data characterizing a state of the environment, action data defining an action performed, reward data representing a reward from the action, and new state data representing a new state to which the environment transitions in response to the action. The demonstration transition data is stored in a replay buffer, typically a finite-sized cache. The method also involves operating on the environment with an actor-critic system, in implementations a neural network system, to generate operation transition data for reinforcement learning transitions. The operation transition data may comprise operational examples of the state data, the action data, the reward data and the new state data. The operation transition data is also stored in the replay buffer. The method samples from the replay buffer to train the actor-critic system.

In some implementations the method samples both the demonstration transition data and the operation transition data in the replay buffer; sampling the demonstration transition data may be prioritized over sampling the operation transition data. The demonstration data may be prioritized more at the start of the learning process than later.

Optionally the replay buffer may also store an actor-critic error signal, such as a Temporal-Difference (TD) error signal, with the operation transitions to allow further prioritized replay by TD error, or "surprise". Transitions may be discarded from the replay buffer as new transitions become available during operation of the system, for example discarding the oldest first. In implementations, however, some or all of the demonstration transitions are retained in the replay buffer throughout the training. The task demonstration may be performed before RL training of the system. The provision of a large replay buffer facilitates off-policy training using uncorrelated sample transitions.

The method is particularly suited to applications where the reward is a sparse reward. Such a sparse reward would typically occur only infrequently amongst the sampled experiences (transitions) as compared with, say, a reward which varies continuously over state space. Thus a sparse reward may have a set of discrete values, for example just two discrete values, dependent upon the state of the environment. In the limit only a single state or group of states might be rewarded, for example those states where a goal is reached, such as the goal of a mechanical control task or some reward point in a free environment. However by storing and retaining demonstration transitions in the replay buffer the frequency with which these states are sampled by the training is increased.

The actor-critic system, more particularly a critic neural network of the actor-critic system, may be trained using an estimated n-step return. Thus return data may be derived from a combination of the reward data and a discounted reward from a predicted succession or rollout of n-1 transitions forward from a current state of the environment. The method may vary n, for example selecting between n=1 and n>1 depending upon whether demonstration or operation transitions are selected. This allows the method to adapt when demonstration trajectories are longer than operation transitions, by allowing a sparse reward to affect more state-action pairs, in particular the values of n preceding state-action pairs.

In implementations the method may perform multiple training steps of the actor-critic system, that is multiple weight update steps, for each environment transition (state-action-new state update). This helps facilitate efficient use of the data gathered from operation of the system, which tends to be more costly than processing time. In implementations the method may separate operation in the environment, and training, into different time intervals or episodes, facilitating real-time operation of the system.

In some implementations the actor-critic system comprises at least one actor neural network and at least one critic neural network. Although described as separate networks in practice these may comprise separate heads on a common network portion, sharing some parameters. In implementations of the technique both these networks are partially trained using supervised learning based on the task demonstration(s).

In broad terms a critic neural network receives state, action, and reward/return data and defines a value function for an error signal, more particularly a TD error signal, which is used to train both actor and critic neural networks. An actor neural network receives the state data and has an action data output defining one or more actions in a continuous action space. The actor-critic system may be implemented in an asynchronous, multi-threaded manner comprising a set of worker agents each with a separate thread, a copy of the environment and experience, and with respective network parameters used to update a global network.

In more detail, some implementations use a pair of actor neural networks and a pair of critic neural networks. One network of the pair, the learning network, implements the learning algorithm; the other, the target network, generates targets for the learning algorithm. The target networks are generated by making a copy of the learning networks at intervals; in practice rather than make an exact copy the weights of the learning networks a fraction of the weights of the learning networks may mixed into the target networks with a proportion defined by a mixing factor. This helps to stabilize the learning.

In implementations the error signal is derived from a return/reward value and outputs of the target actor and critic networks, and this may be used to update the weights of the learning critic network. The error signal may be used to determine a loss for updating the weights based on a sample or minibatch taken from the replay buffer, that is using the operation transition data and the demonstration transition data.

The learning actor network may be updated using a deterministic policy gradient, integrating (averaging) over just the state space rather than both the state and action space, because the action policy is deterministic based upon the state. This policy gradient defines the performance of a policy function mapping the state data to the action data. The policy gradient may be approximated from a product of the gradient of the output of the (learning) critic neural network with respect to actions and the gradient of the output of the (learning) actor neural network with respect to its weights. These gradients may again evaluated on a sample or minibatch taken from the replay buffer.

Input data to the system demonstrating a task may be in any convenient form, for example movement and/or force data in one, two or three dimensions, for one or multiple joints, actuators or other moving parts. Such data may be provided, for example, as cartesian or polar coordinates and/or joint angles and the like. Optionally batch normalization may be employed. For example in some applications the training data comprises kinesthetic teaching data from manipulation of a mechanical system such as a robot. Additionally or alternatively a simulation, for example a simulated robot, may be manipulated. In principle any human or mechanical input may be employed to provide demonstration data. Optionally an action data output for controlling actions to be performed by a robot or other mechanical device may be provided with an interface module to impose safety or other constraints on the action data.

In other applications the input data may be derived from a mouse, trackball, or other pointing device and/or from a simulation and the environment may be a virtual environment or simulation. For example an agent may be controlled in a labyrinth or open virtual environment an agent to obtain a reward, such as identifying an exit or collecting an object. Potentially input data may be derived from video if processing is employed to identify movements/actions.

In another aspect an off-policy, reinforcement learning, actor-critic neural network system selects actions to be performed by an agent interacting with an environment to perform a task in an attempt to achieve a specified result.

The system may comprise a first input to receive an observation comprising state data characterizing a state of the environment in which the system operates, and reward data representing a reward from operating with an action in the environment. At least one actor neural network may receive the state data and define a policy function mapping the state data to action data. An output may provide the action data for the agent to perform the action, to transition the environment to a new state. At least one critic neural network may receive the action data, the state data, and return data derived from the reward data, and define a value function for an error signal. The at least one actor and critic neural networks may share some parameters (weights). A replay buffer stores reinforcement learning transitions comprising operation transition data from operation of the system. The operation transition data may comprise tuples, that is data groups, comprising the state data, the action data, the reward data, and new state data representing the new state. A second input, which may be the same input as the first input, receives training data defining demonstration transition data for demonstration transitions. The demonstration transition data may comprise a set of the tuples from a demonstration of the task, such as a control task, within the environment. Thus reinforcement learning transitions stored in the replay buffer include the demonstration transition data. The neural network system may be configured to train the at least one actor neural network and the at least one critic neural network off-policy. The off-policy training may use the error signal and stored tuples from the replay buffer comprising tuples from both the operation transition data and the demonstration transition data.

The subject matter described in this specification can be implemented in particular embodiments so as to realize one or more of the following advantages.

Implementations of the system facilitate improved training of reinforcement learning systems, in particular facilitating training when rewards are sparse. This represents an important class of practical problem in robotics and other fields since a convenient reward may often be binary, for example defined as success/failure in a task, and it may not be straightforward to define a useful continuous reward. Implementations of the system use demonstrations to facilitate identification of the one or more goals having sparse rewards, in a particular manner which enables the use of deterministic policy gradients. This in turn facilitates implementation of the system in high dimensional continuous action spaces. Many control tasks, for example manipulation and legged locomotion, require continuous control. In implementations of the system good results can be obtained from just 20-30 minutes of human input.

In some implementations the reinforcement learning system facilitates efficient use of the demonstration data, which in turn enables substantially faster, more efficient training and hence substantially reduced processing power and, in implementations, reduced memory requirements compared to alternative approaches. In some implementations the system enables a robot or other mechanical agent to learn to perform a task which includes a degree of variation or unpredictability. For example by merely specifying a goal of the task the system is able to adapt in a manner which other techniques find difficult, and may thus achieve faster, better learning with, at the same time, reduced computational requirements.

Applications of the described methods and systems include reinforcement learning tasks where the agent is a robot agent interacting with the environment to accomplish a task or an autonomous or semi-autonomous land, air or water-borne vehicle navigating through the environment. In general terms, the agent may be a mechanical or electronic agent and the actions may comprise control inputs to control the mechanical or electronic agent. The observations may be derived from sensors, for example agent-associated state, force or image sensors, and/or they may be derived from electrical or mechanical signals from the agent.

In some other applications the agent may control actions in an environment comprising items of equipment, for example in a data center or grid mains power or water distribution system, or in a manufacturing plant. Then the observations may comprise observations of power or water usage by equipment, or observations of power generation or distribution control, or observations of usage of a resource or of waste production. The agent may control actions in the environment to increase efficiency, for example by reducing resource usage, and/or reduce the environmental impact of operations in the environment, for example by reducing waste.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
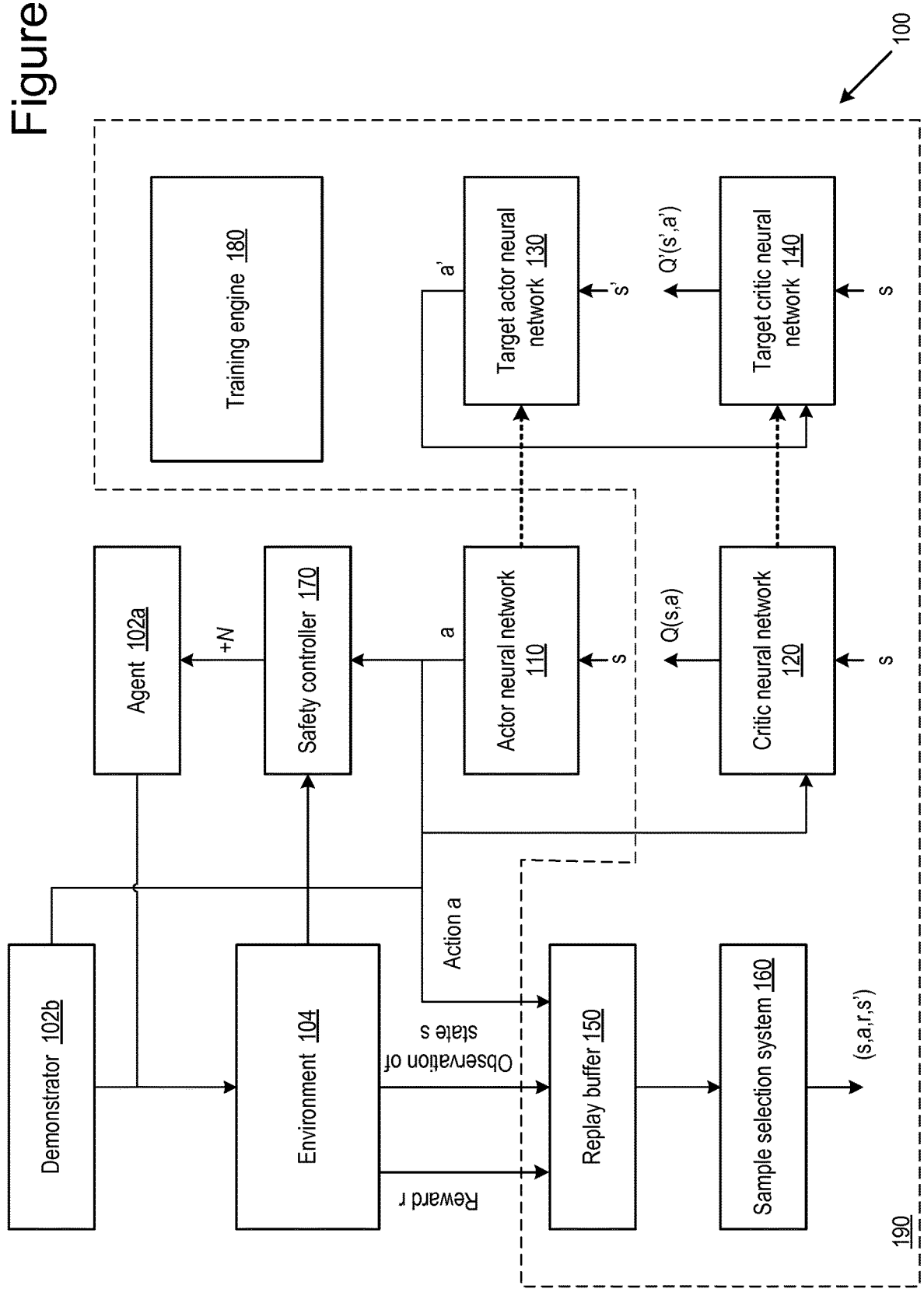
FIG. 1 shows an example reinforcement learning system.

This specification generally describes a reinforcement learning system, implemented as computer programs on one or more computers in one or more locations, that selects actions to be performed by a reinforcement learning agent interacting with an environment by using neural networks. This specification also describes how such a system can adjust the parameters of the neural networks.

The system has an advantage that an agent such as a robot, or autonomous or semi-autonomous vehicle can learn to perform a task based on demonstrations, for example by a human. However unlike a system in which a robot merely learns a scripted trajectory the system can learn based upon a desired goal for a task, which allows greater flexibility in the response of the system. For example, consider the task of inserting a wire into a connector: a predefined or scripted motion finds it difficult to handle variations in shape and stiffness of the wire whereas a goal based system may be able to more easily adapt.

Reinforcement learning systems can provide such flexibility. The goal may be defined by a reward. This may be smoothly shaped to gradually increase the reward as the goal is approached, in the foregoing example, say, based upon a distance of the wire from the connector. However such reward shaping is difficult in practice and can lead to bizarre behavior. Use of a sparse reward function, such as +1 for correct completion of the task and 0 otherwise, could address this problem but can make it difficult for the system to learn as the reward may only rarely be encountered during random exploration of the control, that is action, space by the agent. Another problem with the application of reinforcement learning to practical systems is that during learning may many thousands of actions may be needed to explore the action space and learn an action control policy which attains the reward. This can cause mechanical wear, as well as being slow and potentially impractical. Maintaining safety during training of the reinforcement learning system is also a consideration. Learning on a simulated environment and then transferring the learned knowledge to the real world can offer a partial solution but additional approaches are desirable. It is particularly desirable to provide techniques which operate in a continuous action space, that is where one or more actions are controlled by a continuous rather than a discrete variable. For example when controlling a robot it is desirable to be able to control a continuous variable associated with a joint, such as joint velocity or force/acceleration, rather than simply controlling the joint between a number of discrete states such as on/off.

Thus some implementations of the described reinforcement learning system address the problem of efficiently training a continuous-control reinforcement learning system using demonstrations. Such rapid training can, for example, reduce mechanical wear with a mechanical agent. Where the agent is electronic, for example a control system for a manufacturing or other plant or facility, or mechanical, such training can help to reduce the risk of the agent selecting a configuration which is practically undesirable during exploration of the state space. Some example implementations of the reinforcement learning system also address the problem of training using a sparse reward, and the problem of maintaining safety.

In broad terms, in order to interact with its environment the agent receives data characterizing the current state of the environment and performs an action from a continuous action space in response to the received data. For example, the agent may be a robot interacting with the environment to accomplish a specific task or an autonomous or semi-autonomous vehicle navigating through the environment.

Data characterizing a state of the environment will be referred to in this specification as an observation. Thus the observations may include, for example, one or more of images, object position data, and sensor data to capture observations as the agent as it interacts with the environment. For example in the case of a robot the observations may comprise one or more of: joint position, joint velocity, joint force, torque or acceleration, for example gravity-compensated torque feedback, and global or relative pose of an item held by the robot. In the case of another mechanical agent the observations may similarly comprise one or more of the position, linear or angular velocity, force, torque or acceleration, and global or relative pose of one or more parts of the agent. The observations may be defined in 1, 2 or 3 dimensions, and may be absolute and/or relative observations. The observations may also include, for example, sensed electronic signals such as motor current or a temperature signal; and/or image or video data for example from a camera or a LIDAR sensor. In the case of an electronic agent the observations may comprise data from one or more sensors monitoring part of a plant or service facility such as current, voltage, power, temperature and other sensors and/or electronic signals representing the functioning of electronic and/or mechanical items of equipment.

Action data from a continuous action space may comprise, for example, position, velocity, or force/torque/acceleration data for one or more joints of a robot or parts of another mechanical agent. Action data may additionally or alternatively comprise electronic control data such as motor control data, or more generally data for controlling one or more electronic devices within the environment the control of which has an effect on the observed state of the environment.

In some implementations the environment is a simulated environment and the agent is implemented as one or more computers interacting with the simulated environment. For example the simulated environment may be a simulation of a robot or vehicle and the reinforcement learning system may be trained on the simulation. In the case of a simulated environment the observations may comprise simulated versions of one or more of the previously described observations or types of observations and the actions may comprise simulated versions of one or more of the previously described actions or types of actions.

FIG. 1 shows an example reinforcement learning (RL) system 100. The reinforcement learning system 100 is an example of a system implemented as computer programs on one or more computers in one or more locations in which the systems, components, and techniques described below are implemented.

The reinforcement learning system 100 selects actions to be performed by a reinforcement learning agent 102a interacting with an environment 104. That is, at each of a plurality of internal time steps, t, the reinforcement learning system 100 receives an observation characterizing a respective state s of the environment 104. In response to the observation the reinforcement learning system 100 selects an action a from a continuous action space, to be performed in response to the observation, and then instructs or otherwise causes the agent 102a to perform the selected action. After the agent 102a performs a selected action, the environment 104 transitions to a new state s' and the system 100 receives another observation characterizing the new state s' and a scalar reward r=R (s, a). The reward may be a numeric value that results from completing the task being performed by the agent 102a.

The reinforcement learning system 100 includes a replay buffer 150, that is memory which stores reinforcement learning transitions as operation transition data, generated as a consequence of the agent 102a interacting with the environment 104 during operation of the RL system. The operation transition data may comprise experience tuples, each comprising state data, action data, new state data, and reward data, for example (s, a, s', r). The stored experience tuples are used for training the reinforcement learning system.

The reinforcement learning system 100 is also configured to receive data resulting from actions to be performed by a demonstrator 102b interacting with environment 104. The actions typically comprise one or more demonstrations of a performance of a task to be learned by the reinforcement learning system 100.

The demonstrator may be, for example, a human demonstrator or an autonomous or intelligent agent such as another trained machine learning system. The demonstrator 102b interacts with the environment in a similar manner to agent 102a, that is performing actions to transition the environment from one state s to another state s' with associated reward data (which may be zero until completion of a task).

Thus the demonstrator 102b interacting with the environment 104 generates reinforcement learning transitions comprising demonstration transition data, which may similarly comprise demonstration experience tuples of state data, action data, new state data, and reward data, for example (s, a, s', r). These are likewise stored in the replay buffer 150 for use in training the reinforcement learning system. Storing the demonstration experience tuples helps to maintain transitions which may include sparse rewards, and thus facilitates propagating the sparse rewards during training.

When the replay buffer is full the oldest operation transition data experience tuples may be discarded. However in some implementations some or all of the demonstration experience tuples are maintained in the replay buffer throughout training of the RL system, discarding, for example overwriting, the operation transition data in preference to the demonstration transition data. The one or more demonstrations may be performed before beginning to train the RL system.

The reinforcement learning system 100 selects actions for agent 102a using an actor neural network 110. The actor neural network is a neural network configured to receive an observation comprising state data representing a state s, and to (deterministically) map the state data to a next action according to a control policy defined by a policy function implemented by the actor neural network. The output of the actor neural network 110 may be one or more continuous values representing one or more corresponding actions to be performed. For example a magnitude of the action may be defined by the continuous value. An example of such a continuous value is a position, velocity or acceleration/torque applied to a robot joint or vehicle part. The reinforcement learning system 100 is trained to perform a task by adjusting values of parameters of the actor neural network 110 to achieve a control policy which performs the task. During training noise is added to the output of the actor neural network 110 to facilitate action exploration.

The reinforcement learning system 100 includes other components, within region 190, which are used when training the RL system but which are not needed once the system has been trained. These other components include a critic neural network 120. The critic neural network is a neural network configured to receive an observation comprising state data representing a state s, and action data for an action a (from the actor neural network 110), and to provide an output which defines an action-value or Q-value representing the value of action a in state s. In some implementations the critic neural network 120 may represent the value or expected return (reward) of action a in state s relative to a baseline value for state s, that is an advantage of action a. The baseline value may represent the expected return from state s when following the control policy, and may be derived from a separate output head, for example linear layer, of the actor neural network. In some implementations the actor and critic neural networks, and the target actor and critic neural networks described later, may each be configured to implement batch normalization.

During training the output of the critic neural network is used to train the actor neural network. Parameters of the critic neural network are also adjusted to learn an action-value function or Q-function, Q(s,a), representing the action-value or Q-value. The critic neural network may be trained using a temporal-difference (TD) error, as described further later. The TD error is dependent on the reward and this ultimately drives training of both the critic and actor neural networks. In more detail, one or more rewards are combined with one or more action-values (Q-values) to provide a TD target for improving the action-value (Q-value): the difference between the combination and a present action-value (Q-value), that is a Q-value which is based upon a current training state, determines a TD error which is used to define a loss for training the critic neural network. A gradient of the action-value (Q-value) from the critic neural network is used to train the actor neural network. The combination of the one or more rewards and one or more Q-values may define a 1-step return, or a n-step return, or a mixture of these. The training of the critic and actor neural networks is described later referring to FIG. 4.

The reinforcement learning system 100 also includes a target actor neural network 130 and a target critic neural network 140. These mimic the actor neural network and critic neural network respectively in that, at intervals, weights from the actor and critic neural networks 110, 120 are copied across to the target actor and critic neural networks. The target actor and critic neural networks are used for determining the 1-step return and/or n-step return which are used for determining the TD target for training the critic neural network, the action-value (Q-value) from which drives training of the actor neural network. This helps to stabilize the learning. In implementations, rather than copying the weights to the target neural networks the weights of the target neural networks slowly track the learning neural networks according to $\theta' \leftarrow \tau\theta(1-\tau)\theta'$ where $\theta'$ denotes the weights of a target network and $\theta$ the weights of a corresponding learning network and $\tau \ll 1$.

A sample selection system 160 selects experience tuples from replay buffer 150 for use in off-policy training of the RL system 100. The sample selection system samples more important experience tuples more frequently. The probability of sampling a particular experience tuple may depend on its priority, which may be partly determined by the last TD error calculated for the transition represented by the experience tuple. The priority may include a positive constant for demonstration experience tuples to increase the probability that these are sampled. The priority may also include a small positive constant for all experience tuples to ensure that all transitions are sampled with some probability.

A training engine 180 controls training of RL system 100 as described later.

In some implementations the system includes a safety controller 170 to inhibit excessive force being applied by a robot or other mechanical agent. Thus the safety controller 170 subjects the one or more continuous values from actor neural network 110, representing one or more corresponding actions, to one or more safety constraints before relaying them to the robot or other mechanical agent. Thus for example an action $u_{agent}$ such as a target velocity may be modified to provide a control signal $u_{control}$ according to $$u_{control} = u_{control} k_a + f_{applied} k_f$$

where $k_a$ and $k_f$ are constants which adjust sensitivity and $f_{applied}$ is an applied force which may, for example be derived from the robot or other mechanical agent. Optionally $u_{control}$ may be further limited, for example to limit a maximum speed or speed increase where $u_{agent}$ represents a velocity. This can help increase the control stability of the system.

Figure 2:
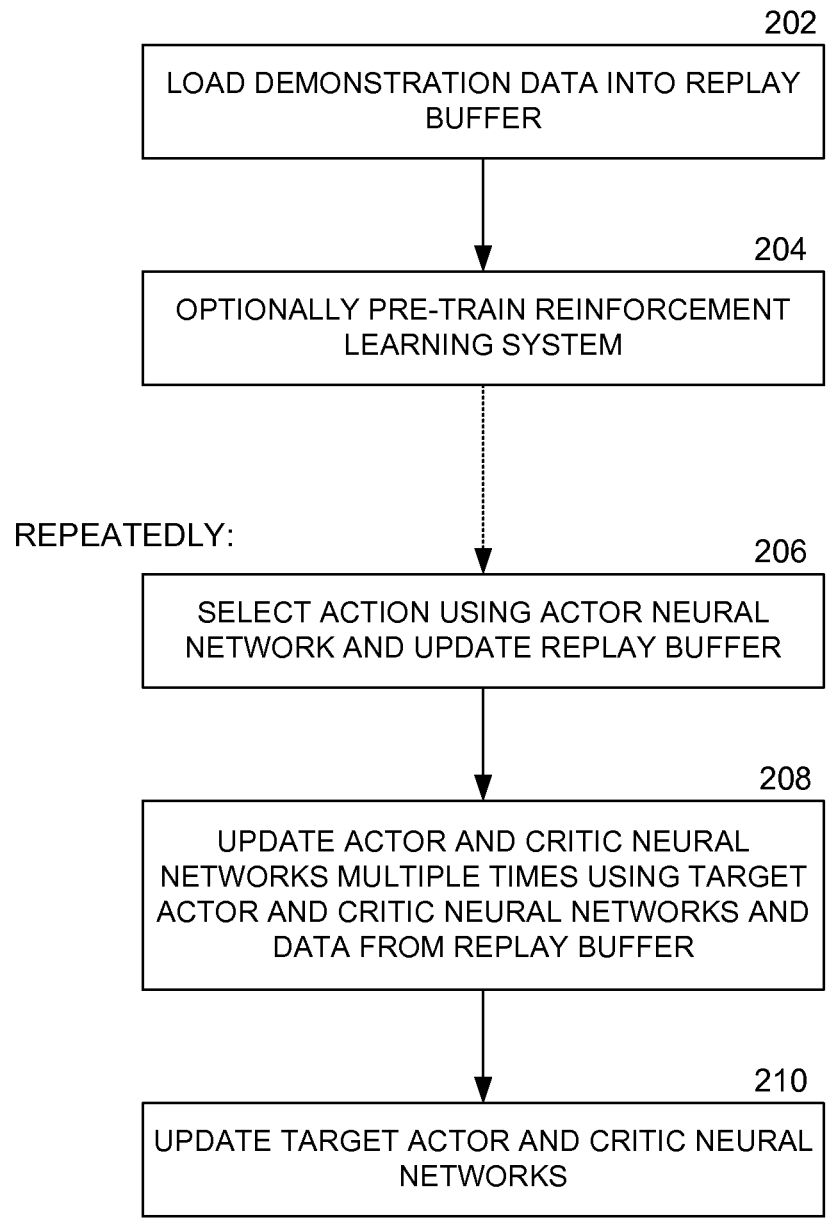
FIG. 2 illustrates a procedure for training the reinforcement learning system of FIG. 1 to select actions to be performed by an agent interacting with an environment.

Referring now to FIG. 2, this shows a flow diagram of a procedure for training reinforcement learning system 100. The procedure may be implemented by reinforcement learning system 100.

At step 202 the procedure loads demonstration data into the replay buffer. The demonstration data comprises demonstration experience tuples collected during one or more demonstrations of a task to be performed by the system. The procedure may then pre-train the RL system using just the demonstration data (step 204), using the training process described later and in conjunction updating the target actor and critic neural networks as previously described.

The RL system then learns through interaction with environment 104. Thus the RL system repeatedly selects an action using the actor neural network 110 and updates the replay buffer (step 206), updates the actor and critic neural networks using the target actor and critic neural networks and data from the replay buffer (step 208) and updates the target actor and critic neural networks, either at intervals or by tracking the learned networks as previously described (step 210). The learning steps 206-210 are performed repeatedly as the RL system is trained. In some implementations the update step 208 is performed multiple times for each environment interaction step. This facilitates efficient use of the data stored in the replay buffer although at the risk of learning from stale data which can result in incorrect Q-values and unstable learning. In practice >10, for example 10-100 update steps may be performed for each environment interaction step.

Figure 3A:
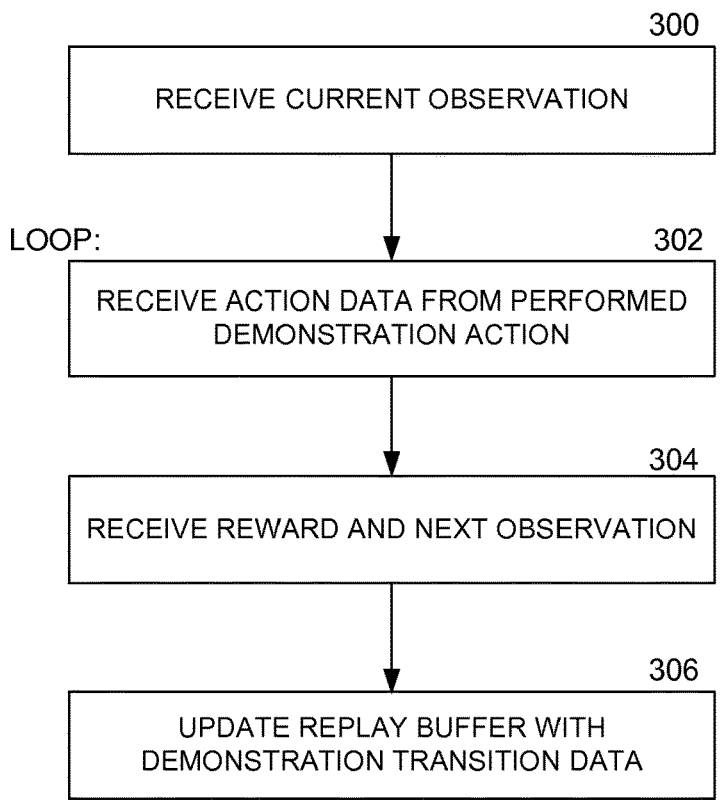
FIGS. 3a and 3b illustrates procedures for storing demonstration and learning interaction data in a replay buffer of the reinforcement learning system of FIG. 1.
Figure 3B:
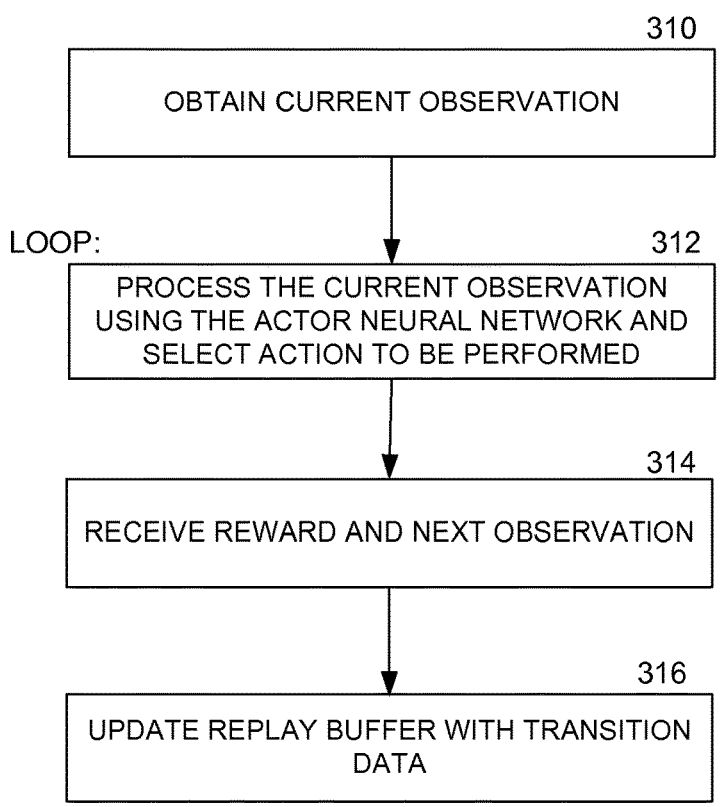

FIGS. 3a and 3b show steps 202 and 206 in more detail. Thus when collecting demonstration data at each of a plurality of environment interaction steps the RL system receives a current observation representing an environment state s (step 300), action data a representing the demonstration action performed (step 302), and receives a next observation representing the state s' to which the an environment transitions in response to the demonstration action, and a reward r (step 304). The replay buffer 160 is updated with a demonstration experience tuple (s, a, s', r) (step 306). The procedure then loops to capture the data from the next demonstration action. The previous next observation may then be used as the current observation for the next action.

FIG. 3b shows a similar procedure is employed when the RL system is learning. Thus each of a plurality of environment interaction steps the RL system receives a current observation representing an environment state s (step 310) and processes the observation using the actor neural network 110 to select an action, a, to be performed. The action may be selected according to:

$$a = \pi(s|\theta^\pi) + N_t$$

where $\theta^\pi$ are the parameters (weights) of actor neural network 110 which implements a function $\pi(\ )$ and $N_t$ is a value of a noise process at a time step t which corresponds to an environment interaction step. The RL system then receives a next observation representing the state s' to which the environment transitions in response to the action a, and a reward r (step 314). The replay buffer 160 is then updated with a operation transition data comprising an experience tuple (s, a, s', r) (step 316). The procedure may delete the oldest action which is not a demonstration action if the replay buffer is full. The procedure then loops to capture the data from the next action; the previous next observation may be used as the current observation for the next action.

Figure 4:
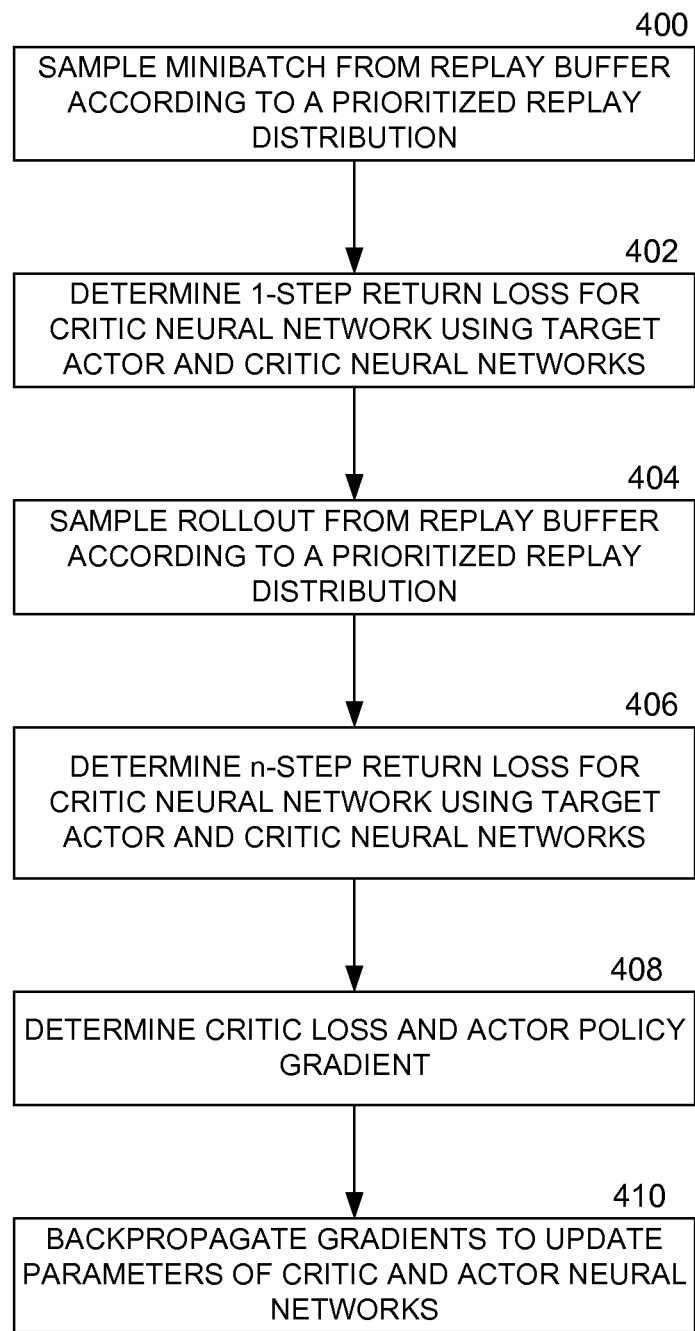
FIG. 4 illustrates details of the training procedure of FIG. 2.

FIG. 4 shows details of an example training process for RL system 100. This may be used for either or both of the pre-training step 206 and update step 208 in FIG. 2. At step 400 the procedure samples a minibatch of $N_T$ transitions, that is experience tuples, from replay buffer 150. The replay buffer may be large to reduce the correlation between sampled transitions, to facilitate learning. The minibatch may be sampled by sample selection system 160 according to a distribution which may be uniform or which may implement prioritized sampling from the replay buffer. For example the probability of sampling a particular transition i may be in proportion to a priority of the transition $p_i$, as described further later.

The procedure then determines a loss for training the critic neural network 120. The critic, or action-value function neural network provides a Q-value which characterizes the value of a state s and action a according to parameters (weights) $\theta^Q$, $Q(s, a|\theta^Q)$. The critic neural network may be trained using a loss which depends on a predicted or target return. In some implementations the target return comprises a mixture of returns which look ahead by different numbers of time steps. For example in one implementation a mixture of a 1-step return and an n-step return may be employed. In broad terms an n-step return comprises the accumulated rewards up to a horizon of n time (environment) steps plus the predicted value of the state beyond the horizon. Alternatively many n-step returns may be mixed together. For example a λ-return assigns a weight to each return where the weights decay exponentially with according to the parameter λ. The benefit of an n-step return may depend, for example, on how noisy or trustworthy is the reward data. A difference between the target return and the Q-value from the critic neural network may be referred to as a TD error; the target return itself also depends on one or more Q-values.

Thus the procedure may determine a 1-step return y according to:

$$R_1 = r + \gamma Q'(s', a'|\theta^{Q'})$$

where $\alpha'=\pi'(s'|\theta^{\pi'})$, $\gamma$ is a discount factor less than unity and $\theta^{Q'}$ and $\theta^{\pi'}$ are the parameters of the target critic and actor neural networks respectively. The 1-step return loss, $L_1$ may then be determined (step 402) by $$L_1=(R_1-Q(s, a|\theta^Q))^2$$

This may be averaged over the set of transitions sampled from the minibatch.

The procedure may also determine an n-step return, for example by sampling a sequence or transitions or rollout from the replay buffer, for example selecting an initial transition of the rollout according to a prioritized replay distribution (step 404). The n-step return may be determined according to:

$$R_n = \sum_{i=0}^{n-1} \gamma^i r_i + \gamma^n Q'(s'_{n-1}, a'_{n-1} | \theta^{Q'})$$

where $a_{n-1}=\pi'(s_{n-1}|\theta^{\pi'})$ and the n-step return loss, $L_n$ may then be determined (step 406) by $$L_n=\tfrac{1}{2}(R_n-Q(s, a|\theta^Q))^2$$

where the factor of ½ is arbitrary. This may be similarly averaged over a minibatch.

The procedure may then determine a total loss for training the critic neural network, $L_{Critic}$ and a policy gradient for training the actor neural network (step 408). The critic loss may comprise a weighted combination of the $L_1$ and $L_n$ losses and may include an L2 regularization loss $L_{reg}^C$:

$$L_{Critic}=L_1+\lambda_1 L_n+\lambda_2 L_{reg}^C$$

where $\lambda_1$ and $\lambda_2$ are hyperparameter weights which trade off the importance of the terms.

A policy gradient for performing a gradient update step for training the actor neural network, $\nabla L_{Actor}$ may be determined according to:

$$\nabla L_{Actor}=-\nabla_a Q(s, a|\theta^Q)\nabla_\theta \pi(s|\theta^\pi)$$

where $a=\pi(s|\theta^\pi)$. An L2 regularization loss $\lambda_2 L_{reg}^R$ may also be added; the policy gradient may be averaged over a minibatch.

The procedure may then employ a gradient update technique to backpropagate the policy gradient to train the actor neural network and a gradient of the critic loss to train the critic neural network (step 410).

When implementing prioritized sampling from the replay buffer the priority of a transition $p_i$ for sample selection may be determined by $$p_i=\delta^2\lambda_3|\nabla_a Q(s, a|\theta^Q)|^2+\epsilon+\epsilon_D$$

where $\delta^2=(R_1 Q(s, a|\theta^Q))^2$, the squared TD error, $\lambda_3$ is a weight, $\epsilon$ is a small positive constant for all sample transitions, and $\epsilon_D$ is a positive constant weight for the demonstration transitions. The TD error used for determining the priority of a transition may be the last TD error calculated for the transition; this may be stored in the replay buffer.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For example, the processes and logic flows can be performed by and apparatus can also be implemented as a graphics processing unit (GPU).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A reinforcement learning system for selecting actions to be performed by an agent interacting with an environment to perform a task, the system comprising one or more computers and one or more storage devices storing instructions that when executed by the one or more computers, cause the one or more processors to perform operations comprising:
receiving an observation comprising state data characterizing a state of the environment, and reward data representing a reward from operating with an action in the environment;
implementing at least one actor neural network, coupled to receive the state data and configured to define a policy function mapping the state data to action data defining an action, wherein the at least one actor neural network has an output to provide the action data for the agent to perform the action, and wherein the environment transitions to a new state in response to the action;

implementing at least one critic neural network, coupled to receive the action data, the state data, and return data derived from the reward data, and configured to define a value function which generates an error signal;

storing reinforcement learning transitions in a replay buffer, the reinforcement learning transitions comprising operation transition data from operation of the system, wherein the operation transition data comprises tuples of said state data, said action data, said reward data and new state data representing said new state; and receiving training data defining demonstration transition data, the demonstration transition data comprising a set of said tuples from a demonstration of the task within the environment, wherein reinforcement learning transitions stored in the replay buffer further comprise the demonstration transition data; and training the at least one actor neural network and the at least one critic neural network off-policy using the error signal and using stored tuples from the replay buffer comprising tuples from both the operation transition data and the demonstration transition data.

2. The system as claimed in claim 1 wherein said reward comprises a sparse reward which has a plurality of discrete values dependent upon the state of the environment.

3. The system as claimed in claim 1 wherein only a minority subset of states of the environment provide the reward.

4. The system as claimed in claim 1, wherein the operations further comprise: sampling the reinforcement learning transitions according to a sampling probability, wherein the sampling probability prioritizes sampling of the demonstration transition data tuples.

5. The system as claimed in claim 1, wherein the return data comprises a combination of the reward data and values from the critic neural network obtained from an (n-1)-step forward rollout of actions selected using the actor neural network; and wherein the system is configured to employ at least two different values of n to train the network.

6. The system as claimed in claim 1 configured to train the critic neural network using return data which comprises a mix of 1-step and n-step returns.

7. The system as claimed in claim 1 wherein the operation further comprise: implementing learning and target actor neural networks and learning and target critic neural networks; updating the learning critic neural network off-policy using the error signal, wherein the error signal is derived from the target critic target neural network, the target actor neural network, and the stored tuples of both the operation transition data and the demonstration transition data; updating the learning actor neural network using a deterministic policy gradient comprising a product of a gradient of the output of the learning critic neural network and a gradient of the output of the learning actor neural network evaluated using the stored tuples of both the operation transition data and the demonstration transition data; and at intervals, updating weights of the target actor neural network using the learning actor neural network and to update weights of the target critic neural network using the learning critic neural network.

8. The system as claimed in claim 1 wherein the training data comprises kinesthetic teaching data from manipulation of a mechanical system.

9. The system as claimed in claim 1 wherein the operation further comprises: imposing safety or other constraints on the action data.

10. The method of training a reinforcement learning system to select actions to be performed by an agent interacting with an environment to perform a task, the method comprising:

capturing training data from a demonstration of the task within the environment, the training data defining demonstration transition data for a series of demonstration transitions, each transition comprising state data characterizing a state of the environment, action data defining an action performed, reward data representing a reward from the action, and new state data representing a new state, wherein the action data defines one or more actions in a continuous action space, and wherein the environment transitions to the new state in response to the action;

storing the demonstration transition data in a replay buffer;

operating on the environment with an actor-critic system to generate operation transition data comprising operational examples of the state data, the action data, the reward data and the new state data;

storing the operation transition data in the replay buffer;

sampling a plurality of stored tuples from the replay buffer, the sampled tuples comprising tuples from both the operation transition data and the demonstration transition data; and training the actor-critic system using the sampled tuples.

11. The method as claimed in claim 10 wherein the sampling prioritizes samples of the demonstration transition data over samples of the operation transition data.

12. The method as claimed in claim 10 wherein at least some of the demonstration transition data is retained in the replay buffer after storing the operation transition data.

13. The method as claimed in claim 10 wherein the reward is a sparse reward.

14. The method as claimed in claim 10 comprising training the actor-critic system using return data derived from a combination of the reward data and a discounted reward from a predicted succession of n-1 transitions forward from a current state of the environment, the method further comprising varying n or combining return data for different values of n.

15. The method as claimed in claim 10 comprising performing multiple training steps of the actor-critic system for each environment transition.

16. The method as claimed in claim 10 comprising operating on the environment during one or more operating time intervals and training the actor-critic system during one or more different, learning time intervals.

17. The method as claimed in claim 10 wherein the actor-critic system comprises learning and target actor neural networks and learning and target critic neural networks, and wherein training the actor-critic system comprises updating weights of the learning critic neural network using an error signal determined from the target actor neural network and target critic neural network, and updating weights of the learning actor neural network using an approximate policy gradient defining the performance of a policy function mapping the state data to the action data.

18. The method as claimed in claim 10 wherein the training data comprises kinesthetic teaching data from manipulation of a mechanical system.

19. The system comprising one or more computers and one or more storage devices storing instructions that when executed by the one or more computers cause the one or more computers to perform operations for training a reinforcement learning system to select actions to be performed by an agent interacting with an environment to perform a task, the operations comprising:
- capturing training data from a demonstration of the task within the environment, the training data defining demonstration transition data for a series of demonstration transitions, each transition comprising state data characterizing a state of the environment, action data defining an action performed, reward data representing a reward from the action, and new state data representing a new state, wherein the action data defines one or more actions in a continuous action space, and wherein the environment transitions to the new state in response to the action;
- storing the demonstration transition data in a replay buffer;
- operating on the environment with an actor-critic system to generate operation transition data comprising operational examples of the state data, the action data, the reward data and the new state data;
- storing the operation transition data in the replay buffer;
- sampling a plurality of stored tuples from the replay buffer, the sampled tuples comprising tuples from both the operation transition data and the demonstration transition data; and
- training the actor-critic system using the sampled tuples.

20. The system as claimed in claim 19 wherein the sampling prioritizes samples of the demonstration transition data over samples of the operation transition data.

\* \* \* \* \*